Patented Aug. 24, 1943

2,327,773

UNITED STATES PATENT OFFICE 2,327,773

AMINOPHENOLS AND THE PREPARATION THEREOF

Joseph B. Dickey, Rochester, N. Y., and Arzy R. Gray, Kingsport, Tenn., assignors to Eastman Kodak Company, Rochester, N. Y., a corporation of New Jersey No Drawing. Application June 27, 1940,
Serial No. 342,800

9 Claims. (Cl. 260—345)

This invention relates to aminophenols and to the preparation thereof. More particularly, this invention relates to N-tetrahydrofurylalkyl-p-aminophenols.

A number of N-alkyl-aminophenols are known, e. g. N-methyl-p-aminophenol (which, in the form of its sulfate, is known in the trades as "Elon" or "Metol"), N-ethyl-p-aminophenol, N-(n-primary-butyl) - p - aminophenol, N - (n - primaryamyl) - p-aminophenol and N-furfuryl-(furylmethyl)-p-aminophenol. The salts of N-methyl-p-aminophenol have been extensively employed as photographic developers for many years. The salts of the N-butyl, N-amyl and N-furfuryl compounds, however, are of little utility for such a purpose, owing, at least in part, to their low solubility in aqueous media.

We have now found that N-tetrahydrofuryl-alkyl-p-aminophenols can be prepared by condensing tetrahydrofurylalkyl primary amines with hydroquinones or with p-halogenophenols, in the latter case in the presence of a copper catalyst. The salts of tetrahydrofurylalkyl-p-aminophenols are very soluble in water (a surprising fact, in view of the low water solubility of the salts of the N-furylalkyl, e. g. N-furylmethyl, compounds), and act as very good photographic developers, we have found.

It is, accordingly, an object of our invention to provide N - tetrahydrofurylalkyl-p-aminophenols and their salts. A further object is to provide a process for preparing these compounds. A still further object is to provide photographic developers comprising these compounds. Other objects will appear hereinafter.

According to one embodiment of our invention, we prepare N-tetrahydroalkyl-p-aminophenols by condensing a hydroquinone with a tetrahydrofurylalkyl primary amine. Water splits out from the condensing substances to give the aminophenol. The condensations are advantageously effected in an autoclave, at a temperature of from 150° to 250° C. About 200° C. is a particularly useful condensation temperature, in practice. The following examples will serve to demonstrate the manner of preparing these new compounds. These examples are not intended to limit our invention.

EXAMPLE 1.—*N-tetrahydrofurylmethyl-p-aminophenol*

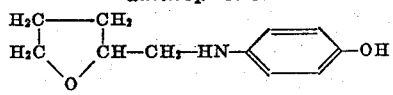

55 g. (0.5 mol.) of hydroquinone, 101 g. (1.0 mol.) of tetrahydrofurfurylamine and 200 g. of water were mixed together and heated in an autoclave at 195° to 205° C. for about 4½ hours. The reaction product was cooled, neutralized with sulfuric acid and then treated with diethyl ether to remove unreacted hydroquinone. The resulting aqueous liquor was decolorized with "Norite" and then concentrated to the point where crystals separated upon cooling. These white crystals were the sulfate of the aminophenol, having the formula given above, and were very soluble in water.

N-tetrahydrofurylmethyl-p-aminophenol can be obtained from the above sulfate by treating an aqueous solution of the sulfate with an aqueous solution of sodium bisulfite or bicarbonate, preferably the former. The aminophenol separates as a white solid from the aqueous mixture. It darkens upon exposure to air.

EXAMPLE 2.—*N-(2-tetrahydrofuryl-n-propyl)-p-aminophenol*

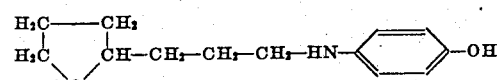

55 g. (0.5 mol.) of hydroquinone, 129 g. (1.0 mol.) of 2-tetrahydrofuryl-n-propyl amine and 200 g. of water were mixed together and heated in an autoclave at 200° C. for from 4 to 5 hours. The reaction product was cooled, neutralized with sulfuric acid and then treated with diethyl ether to remove unreacted hydroquinone. The resulting aqueous liquor was decolorized with "Norite" and then concentrated to the point where crystals separated upon cooling. These white crystals were the sulfate of the aminophenol having the formula given above, and were very soluble in water. The free aminophenol can be obtained from the sulfate in the manner described in Example 1.

EXAMPLE 3.—*C-methyl-N-tetrahydrofurylmethyl-p-aminophenol*

62 g. (0.5 mol.) of methylhydroquinone (2-methyl-1,4-dihydroxybenzene), 101 g. (1.0 mol.) of tetrahydrofurfurylamine and 200 g. of water were mixed together and heated in an autoclave at 195° C. to 205° C. for about 5 hours. The reaction product was cooled, neutralized with sulfuric acid and then treated with diethyl ether to remove unreacted methylhydroquinone. The resulting aqueous liquor was decolorized with "Norite" and then concentrated to the point where crystals separated upon cooling. These white crystals were the sulfates of two aminophenols, viz. a N-tetrahydrofurylmethyl-p-aminophenol having a methyl group ortho to the hydroxyl group, and a N-tetrahydrofurylmethyl-p-aminophenol having a methyl group meta to the hydroxyl group. A mixture of the free aminophenols can be obtained from the mixture of sulfates in the manner described in Example 1.

In the foregoing Example 3, methoxyhydroquinone (1,4-dihydroxy-2-methoxy-benzene) or chlorohydroquinone can be used instead of methylhydroquinone.

In all of the foregoing examples, water is introduced initially into the reaction mixture as a diluent. Diluents serve to decrease formation of tarry side reaction products. From about 5 to about 15 molecular proportions of water for each molecular proportion of hydroquinone are advantageously employed.

In all of the foregoing examples the reaction mixture can be neutralized with any suitable acid instead of sulfuric acid; with hydrochloric acid for example.

According to a further embodiment of our invention, we prepare N-tetrahydrofurylalkyl-p-aminophenols by condensing a p-halogenophenol with a tetrahydrofurylalkyl primary amine, in the presence of a copper catalyst. The following example illustrates the process.

EXAMPLE 4.—*N-(β-tetrahydrofurylethyl)-p-aminophenol*

12.8 g. (0.1 mol.) of p-chlorophenol, 25 g. (0.25 mol.) of β-tetrahydrofurylethylamine, 50 cc. of water and 2 g. of copper sulfate were mixed together and heated in an autoclave at 130° to 160° C. for from 4 to 5 hours. The cooled reaction product was neutralized with sodium bicarbonate and then treated with sufficient sulfuric acid to convert all the amino substances to their sulfates. The resulting aqueous mixture was treated with diethyl ether to extract unreacted p-chlorophenol. The resulting aqueous liquor was decolorized with "Norite" and then concentrated to the point where crystals separated upon cooling. These white crystals were the sulfate of N-(β-tetrahydrofurylethyl-p-aminophenol. The free aminophenol can be isolated in the manner described in Example 1.

The N-tetrahydrofurylalkyl-p-aminophenol salts, especially the N-tetrahydrofurylmethyl, can be employed instead of "Metol" in compounding photographic developers.

Tetrahydrofurylamine can be prepared by hydrogenating furfuraldoxime, as described in the copending application of J. G. McNally, J. B. Dickey and A. R. Gray, Serial No. 263,526, filed March 22, 1935. β-tetrahydrofurylethylamine and 2-tetrahydrofurylpropylamine can be prepared by hydrogenating α-furyl-β-nitroethylene or furylacrolein oxime, in the presence of a suitable catalyst such as nickel or copper chromite. See Jour. Am. Chem. Soc. 52, 4349 (1930).

What we claim as our invention and desire to be secured by Letters Patent of the United States is:

1. A N-(2-tetrahydrofuryl)-alkyl-p-aminophenol.
2. N-(2-tetrahydrofuryl)-methyl-p-aminophenol.
3. A N-(2-tetrahydrofuryl)-methyl-p-aminophenol sulfate.
4. N-[β-(2-tetrahydrofuryl)ethyl]-p-aminophenol.
5. A process for preparing a N-(2-tetrahydrofuryl)-alkyl-p-aminophenol comprising condensing, with the elimination of water, a hydroquinone with a (2-tetrahydrofuryl)-alkyl primary amine.
6. A process for preparing N-(2-tetrahydrofuryl)-methyl-p-aminophenol comprising condensing, with the elimination of water, a hydroquinone with (2-tetrahydrofuryl)-methyl amine.
7. A process for preparing a N-[β-(2-tetrahydrofuryl)-ethyl]-p-aminophenol comprising condensing, with the elimination of water, a hydroquinone with β-(2-tetrahydrofuryl)-ethyl amine.
8. A process for preparing a N-(2-tetrahydrofuryl)-alkyl-p-aminophenol comprising condensing, with the elimination of water, a hydroquinone with a (2-tetrahydrofuryl)alkyl primary amine, in the presence of from about 5 to about 15 molecular proportions of water for each molecular proportion of hydroquinone employed.
9. A process for preparing a N-(2-tetrahydrofuryl)-alkyl-p-aminophenol comprising condensing, with the elimination of water, a hydroquinone with a (2-tetrahydrofuryl)-alkyl primary amine, in the presence of a diluent.

JOSEPH B. DICKEY.
ARZY R. GRAY.

CERTIFICATE OF CORRECTION.

Patent No. 2,327,773. August 24, 1943.

JOSEPH B. DICKEY, ET AL.

It is hereby certified that error appears in the printed specification of the above numbered patent requiring correction as follows: Page 2, second column, line 3, for "Tetrahydrofurylamine" read --Tetrahydrofurfurylamine--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.